United States Patent
Miyazaki

Patent Number: 5,879,740
Date of Patent: Mar. 9, 1999

[54] PROCESS FOR THE PREPARATION OF COMPOSITE SHEET COMPRISING SUPPORT AND TRANSPARENT SOLID FINE PARTICLES

[75] Inventor: Masaaki Miyazaki, Kanagawa, Japan

[73] Assignee: Fuji Photo Film Co., LTD., Minami-ashigara, Japan

[21] Appl. No.: 977,062

[22] Filed: Nov. 24, 1997

Related U.S. Application Data

[63] Continuation of Ser. No. 645,118, May 13, 1996, abandoned.

[30] Foreign Application Priority Data

May 11, 1995 [JP] Japan ................. 7-137160

[51] Int. Cl.⁶ ............... B05D 1/32; B05D 5/06; B05D 3/10
[52] U.S. Cl. .......... 427/163.4; 427/202; 427/203; 427/204; 427/336
[58] Field of Search .............. 427/163.1, 163.3, 427/163.4, 198, 202, 203, 204, 307, 340, 352, 434.2, 336

[56] References Cited

U.S. PATENT DOCUMENTS

| | | | |
|---|---|---|---|
| 2,281,100 | 4/1942 | Lard | 427/180 |
| 3,861,791 | 1/1975 | Burke, Jr. et al. | 352/130 |
| 4,849,265 | 7/1989 | Ueda et al. | 428/40 |
| 5,035,920 | 7/1991 | Smrt et al. | 427/202 |

Primary Examiner—Shrive Beck
Assistant Examiner—Fred J. Parker
Attorney, Agent, or Firm—Burns, Doane, Swecker & Mathis, LLP

[57] ABSTRACT

A process for the preparation of a composite sheet is disclosed. The composite sheet comprises a film support and transparent solid fine particles fixed thereon. The support has a surface that can be swelled with an aqueous or organic solvent. The process comprises the steps of (1) bringing the support into contact with the solvent to swell the surface of the support, whereby rendering the surface adhesive, (2) bringing the particles into contact with the adhesive surface, whereby fixing a part of the particles onto the surface; and then (3) moving the support in a solvent to remove the particles that are not fixed onto the surface from the support. An apparatus for the preparation of the composite sheet is also disclosed.

7 Claims, 3 Drawing Sheets

PROCESS FOR THE PREPARATION OF COMPOSITE SHEET COMPRISING SUPPORT AND TRANSPARENT SOLID FINE PARTICLES

This application is a continuation, of application Ser. No. 08/645,118, filed May 13, 1996 abandoned.

FIELD OF THE INVENTION

The present invention relates to a process and an apparatus for the preparation of a composite sheet comprising a support and transparent solid fine particles fixed thereon.

BACKGROUND OF THE INVENTION

A composite sheet comprises a support and transparent solid fine particles attached thereon. The present specification hereinafter sometimes refers to the transparent solid fine particles as beads.

Japanese Patent Provisional Publication Nos. 6(1994)-347621, 6(1994)-347622, 6(1994)-347623, 6(1994)-347624 and 6(1994)-347625 disclose a composite sheet having the beads, which can be used as a retroreflective sheet. Glass beads are generally used in the retroreflective sheet.

The retroreflective sheet returns light to a light source. The sheet has been used on a surface of a guide-post, which preferably reflects light toward a light source, namely a headlight of a car. The glass beads function as fine spherical lenses in the retroreflective sheet.

The optical sheet having the beads can also be used as a light diffusing sheet. The sheet can be attached on a liquid crystal display (LCD) to enlarge the angle of field of the LCD, which usually has a narrow angle. The beads preferably have a diameter smaller than the matrix of the liquid crystal. The light diffusing sheet comprises a transparent film having a surface filled with such small beads. The light diffusing sheet can also function as a protective film of a polarizing plate. Accordingly, the number of the layers in the LCD can be reduced by using the sheet. The transmittance of the LCD increases with decreasing the number of the layers. The transmittance is the most important factor of the LCD. If one layer is deleted from the LCD, the transmittance increases by about 8%.

The light diffusing sheet can also be used as a screen for a projected image. An image projected from a liquid crystal projector has a problem of moiré, which is caused by stripes of a color filter in the liquid crystal projector. The composite sheet having the beads can solve the problem by diffusing light while keeping the surface transmittance of the screen.

According to the prior art, a layer comprising a binder should be provided on a sheet to fix the beads.

Japanese Patent Provisional Publication Nos. 6(1994)-347621, 6(1994)-347622, 6(1994)-347623, 6(1994)-347624 and 6(1994)-347625 disclose a process for the preparation of the optical composite sheet, which comprises the steps of forming the layer comprising the binder on a support, arranging beads on the layer, and pressing them, for example between nip rollers to embed the beads in the layer.

SUMMARY OF THE INVENTION

The applicant has studied a process for the preparation of a composite sheet by embedding beads in a layer comprising a binder. As a result, the applicant notes minute scratches on the beads and the layer, which are formed by the pressure while embedding the beads in the layer. Further, the process includes the troublesome step of arranging beads on the layer.

An object of the present invention is to provide a process and an apparatus that can prepare a composite sheet of high quality by simple procedures.

The present invention provides a process for the preparation of a composite sheet comprising a film support and transparent solid fine particles fixed thereon, said support having a surface that can be swelled with an aqueous or organic solvent, wherein the process comprises the steps of:

(1) bringing the support into contact with the solvent to swell the surface of the support, whereby rendering surface adhesive;

(2) bringing the particles into contact with the adhesive surface, whereby fixing a part of the particles onto the surface; and then (3) moving the support in a solvent to remove the particles that are not fixed onto the surface from the support.

The invention also provides an apparatus for the preparation of a composite sheet comprising a film support and transparent solid fine particles fixed thereon, wherein the apparatus comprises:

(a) a vessel containing therein a solvent and the particles placed in the solvent;

(b) a roller at least a portion of which is placed in the vessel, for conveying the support in such manner that the support passes through the solvent, comes into contact with the particles in the solvent, and then passes through the solvent again;

(c) a means attached to the vessel for supplementing a supply of particles to the vessel; and (d) a means attached to the vessel for vibrating the vessel to move the particles in the vessel.

The process of the present invention is characterized by the steps of (1) swelling the surface of the support with a solvent, (2) fixing a part of the beads onto the surface; and then (3) removing the beads that are not fixed onto the surface from the support.

According to the process of the invention, the beads are arranged on a composite sheet by using the adhesive surface of the support, which are formed by swelling the surface with a solvent. Accordingly, the composite sheet can easily be prepared, compared with a conventional process of embedding the beads in a layer. Further, no scratches are formed on the beads or the layer because the process of the invention does not require a high pressure. Furthermore, the beads can most densely and uniformly be arranged on the support in the composite sheet prepared by the present invention. After an excess amount of the beads are arranged on the support, the beads that are not fixed onto the surface can be removed from the support to prevent the beads from overlapping.

Therefore, a composite sheet of high quality can be prepared by simple procedures according to the process of the present invention. The composite sheet can more easily be prepared by using the apparatus of the present invention.

DETAILED DESCRIPTION OF THE INVENTION

Support

Figure 1:
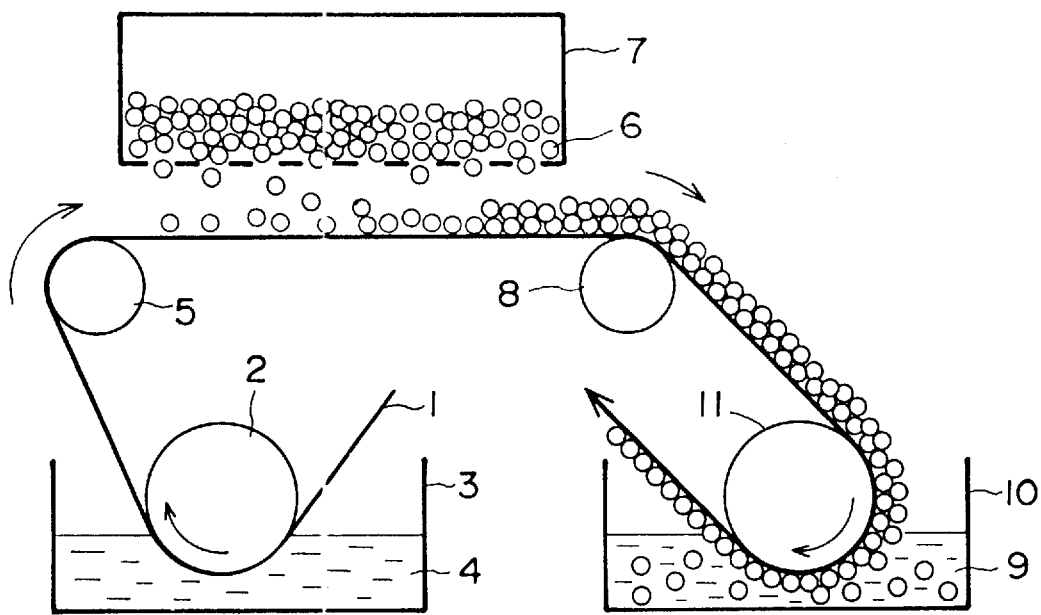
FIG. 1 is a sectional view schematically illustrating the first embodiment of the apparatus of the invention.

The transmittance of the film support is determined depending on use of a composite sheet. A transparent support is usually used in a light retroreflective sheet and a light diffusing sheet.

The transparent support is generally made of glass or a plastic. A composite sheet preferably has a flexible and light support, which is made of a plastic. In the present invention, the support should have a surface that can be swelled with a solvent. The plastic can usually be swelled with a solvent.

Examples of the polymers for the plastic include a cellulose ester, a cellulose ether, polycarbonate, polystyrene, polyacrylate, polymethacrylate, polystyrene, polyester, polyethylene, polyvinyl alcohol, polysulfone, polyethersulfone and a norbornene resin. The cellulose ester (e.g., cellulose acetate), polyester (e.g., polyethylene terephthalate), polycarbonate, polyvinyl alcohol, polysulfone and polyethersulfone are preferred.

The support has a thickness preferably in the range of 25 to 350 µm, more preferably in the range of 30 to 310 µm and most preferably in the range of 45 to 200 µm.

If a thin support is used, the support tends to curl by the influence of the surface layer comprising a polymer (described below). In such a case, an anticurl layer is preferably provided on the other side of the support. The anticurl backing layer preferably comprises a polymer that is analogous to the binder of the layer. The term "analogous" means that a characteristic causing the curl (e.g., hygroscopic character) is analogous.

The support may further optionally contain a plasticizer, an ultraviolet absorbent, a cross-linking agent, a slipping agent, a stabilizer, a dispersing agent, a dye, a pigment, a defoaming agent, a lubricant, an anticlouding agent or a preservative. These additives have already been known.

The support can be prepared according to a conventional solvent casting or melt casting method. The solvent casting method comprises the steps of dissolving a polymer in a solvent to form a solution and coating the solution on a metallic belt to form the support as a polymer film. The melt casting method comprises the steps of heating a polymer resin to form a melt and casting the melt to form the support.

The support can comprise a base film and a surface layer. In the present specification, the term "support" include the combination of the base film and the surface layer. Accordingly, the surface of the support means the surface layer in the case that the support comprises the base film and the layer. The surface layer should be swelled with a solvent.

The surface layer comprises a polymer. Various natural or synthetic polymers can be used in the surface layer. Examples of the polymers for the surface layer include a cellulose ester, a cellulose ether, polycarbonate, polystyrene, polyacrylate, polymethacrylate, polystyrene, polyester, polyethylene, polyvinyl alcohol, gelatin, polyvinyl acetate, polyvinyl chloride, polyvinylidene chloride, polyvinyl butyral, polyurethane, polypropylene, polysulfone, polyethersulfone, a styrene-butadiene rubber, an isoprene rubber, a nitrile rubber, a butyl rubber, an acrylic rubber, a urethane rubber and a norbornene resin.

The surface layer may further optionally contain a plasticizer, an ultraviolet absorbent, a cross-linking agent, a slipping agent, a stabilizer, a dispersing agent, a dye, a pigment, a defoaming agent, a lubricant, an anticlouding agent or a preservative. These additives have already been known.

The polymer contained in the surface layer preferably has a refractive index (namely a refractive index of the surface layer) analogous to the refractive index of the polymer contained in the plastic sheet of the support. In more detail, the difference in the refractive index is preferably smaller than 0.5, more preferably smaller than 0.2, and most preferably smaller than 0.2. The polymer of the surface layer is preferably the same as the polymer of the plastic sheet to obtain the substantially identical refractive index.

The polymer contained in the surface layer or the plastic sheet preferably has a refractive index different from the refractive index of the beads to diffuse light. In more detail, the ratio of the two refractive indexes is preferably not larger than 0.95 or not smaller than 1.05, more preferably not larger than 0.83 or not smaller than 1.15, and most preferably not larger than 0.71 or not smaller than 1.25.

Beads

Transparent solid fine particles are used as beads in the present invention. The beads are preferably made of glass or plastic. Glass is generally preferred to the plastic. The particles preferably have a spherical shape.

The particle size of the beads is determined based on use of the composite sheet. The beads preferably have a small particle size. In the case that the composite sheet is used as a light diffusing sheet of a liquid crystal display, the beads preferably have a particle size smaller than the matrix (imaging element) of the liquid crystal.

The beads has an average particle size preferably in the range of 1 to 100 µm, more preferably in the range of 5 to 70 µm, and most preferably in the range of 15 to 60 µm.

In the case that a surface layer is provided on a base film, the average particle size is preferably 3 to 50 times, more preferably 4 to 20 times, and most preferably 5 to 12 times the thickness of the surface layer. The relation between the average particle size and the thickness of the layer is preferably adjusted by arranging the amount of the polymer contained in the layer. Accordingly, the average particle size is preferably determined based on use of the composite sheet, and then the thickness of the layer is preferably adjusted appropriately.

The beads preferably have a uniform particle size distribution. In more detail, the maximum particle size is preferably smaller than 2 times, and more preferably smaller than 1.5 times the average particle size. The minimum particle size is preferably larger than half, and more preferably larger than two thirds of the average particle size.

Some glass beads have been commercially available as beads for a retroreflective sheet or crushing or dispersing particles. The commercial products can be obtained from Union Co., Ltd. (Unibeads™, Uniflash™) or Japan Electronic Glass Co., Ltd.

Solvent

The solvent used in the step (1) swells the surface (generally comprising a polymer) of the support to form an adhesive surface. In the present invention, the adhesive surface means that the beads can be attached to the swelled surface of the support.

The surface substance is swelled with the solvent used in the step (1) in such a manner that the volume of the substance increases preferably in the range of 1.05 to 50 times, more preferably in the range of 1.2 to 30 times, and most preferably in the range of 1.4 to 10 times. The increase in the volume ratio is determined by measuring the volumes of a dry polymer and a swelled polymer.

In the case that a cellulose ester (e.g., triacetyl cellulose) is used in the support, acetone is a preferred solvent. Acetone is also preferably used in the case that the support is made of polycarbonate, polysulfone or polyethersulfone. In the case that polyvinyl alcohol is used in the support, water, an alcohol (e.g., methanol) or a mixture thereof is preferably used as the solvent. In the case that a gelatin surface layer is provided on a sheet (e.g., triacetyl cellulose sheet, polyethylene terephthalate sheet), water is a preferred solvent.

The solvent used in the step (3) can be identical with the solvent used in the step (1).

(1) Swelling the surface of the support

At the first step, the surface of the support is swelled with the solvent to make the surface adhesive.

The first step can be conducted by immersing the support in the solvent, coating the solvent on the support, spraying the solvent over the support, or laminating a sheet containing the solvent with the support. The support is preferably immersed in the solvent.

The support is immersed in the solvent preferably for 0.01 to 60 seconds, more preferably for 0.02 to 20 seconds, and most preferably for 0.05 to 10 seconds.

At the first step, the support is preferably swelled with the solvent from the surface of the support to the depth of 0.05 to 25 $\mu$m, more preferably 2 to 20 $\mu$m, and most preferably 5 to 18 $\mu$m.

(2) Fixing the beads onto the adhesive surface

At the second step, beads are fixed onto the adhesive surface of the support.

The second step can be conducted by dispersing the beads on the surface, moving the support in a vessel containing the beads in such a manner that the support comes into contact with the beads, or laminating the support on a sheet or a roller to which the beads have been attached. The former two methods are preferred.

According to the present invention, the beads not fixed onto the support can be removed from the support at the third step (described below). Accordingly, an excess amount of the beads can be used at the second step. If the excess amount of the beads are used and the extra beads are removed, the beads can most densely and uniformly be arranged on the support while preventing the beads from overlapping. The term "excess amount" means that the amount of the attached beads is larger than the amount of the beads most densely and uniformly arranged on the support. If an excess amount of the beads is used, the beads overlap on the support (in other words, some beads are arranged on other beads). The excess amount of the beads can be calculated from the surface area of the support and the average particle size of the beads.

(3) Removing the extra beads

At the third step, the support is immersed in the solvent to remove the beads that are not fixed onto the surface from the support.

At the third step, the support is immersed in the solvent preferably for 0.01 to 300 seconds, more preferably for 0.02 to 20 seconds, and most preferably for 0.05 to 10 seconds.

Most of the indirectly attached beads can be removed by the third step. If necessary, another removing step can additionally be conducted. The other removing steps include reversing the support, vibrating the support, and pressing the support between rollers under a light pressure. The extra beads can also be removed by applying an air stream to the support.

Apparatus

The above-mentioned steps can easily be conducted on a small scale according to the process of the invention. On the other hand, the steps are conducted on a large scale preferably by using an apparatus of the present invention. The apparatus is described below referring to the drawings.

FIG. 1 is a sectional view schematically illustrating the first embodiment of the apparatus of the present invention.

As is shown in FIG. 1, a support (1) is conveyed by a roller (2), and immersed in a solvent (4) in a vessel (3). The support is swelled with the solvent to make the surface adhesive. The swelled support is conveyed by a roller (5) to a means (7) for dispersing beads (6). The dispersed beads are attached to the surface of the support. The support is then conveyed by a roller (18), and immersed in a solvent (9) in a vessel (10). The extra beads are removed from the support. In the first embodiment shown in FIG. 1, the solvents used in the first and third steps are contained in different vessels (3&10). The solvent can be contained in the same vessel.

As is described above, the first embodiment of the apparatus comprises a vessel (3) containing a solvent (4), a means (7) for scattering the particles (6) on the surface of the support, a vessel (10) containing a solvent (9) and a means (2, 5, 8, 10) for conveying the support from the vessel (3) to the vessel (10) through the means (7).

Figure 2:
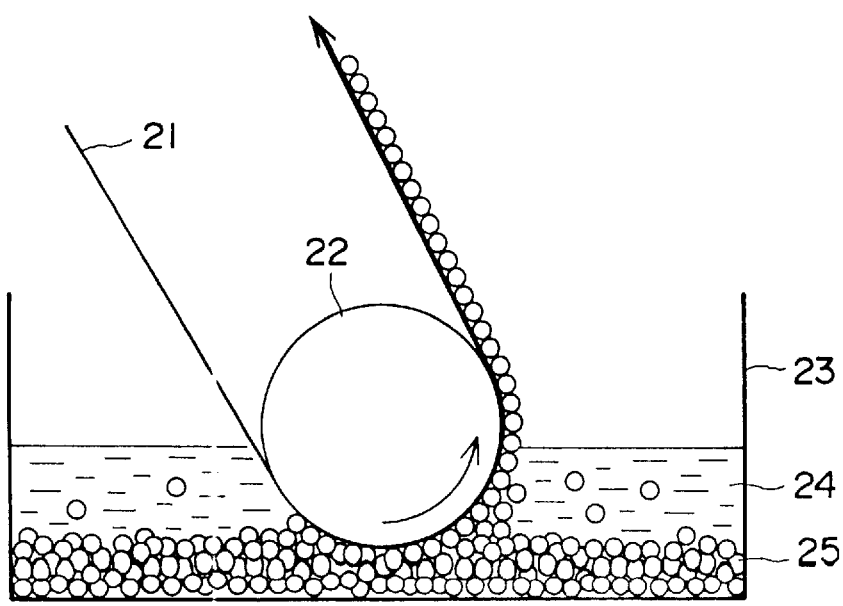
FIG. 2 is a sectional view schematically illustrating the second embodiment of the apparatus of the invention.

FIG. 2 is a sectional view schematically illustrating the second embodiment of the apparatus of the invention.

As is shown in FIG. 2, the support (21) is conveyed by a roller (22) and immersed in a solvent (24) in a vessel (23). The support is swelled with the solvent to make the surface adhesive. The swelled support is conveyed by the roller (22) whereby the support comes into contact with beads (25) deposited in the solvent (24). The deposited beads are attached to the surface of the support. The support is further conveyed by the roller (22), and immersed in the solvent (24) again. The extra beads are removed from the support. In the second embodiment shown in FIG. 2 has an advantage of conducting the process of the invention by a simple apparatus.

As is described above, the second embodiment of the apparatus comprises a vessel (23) containing beads (25) and a solvent (24) and a means (22) for conveying a support (21) in the vessel (23). The beads (25) are deposited in the solvent (24). The means (22) functions in such a manner that the support (21) passes through the solvent (24), comes into contact with the deposited beads (25), and then passes through the solvent (24) again.

The size (particularly width) of the rollers used in the embodiments is determined by the size of the composite sheet to be prepared. The diameter of the roller is usually in the range of 10 to 300 mm. The speed of conveying the support (line speed) is preferably in the range of 0.5 to 10 m per minute.

Various means can be attached to the second embodiment shown in FIG. 2.

Figure 3:
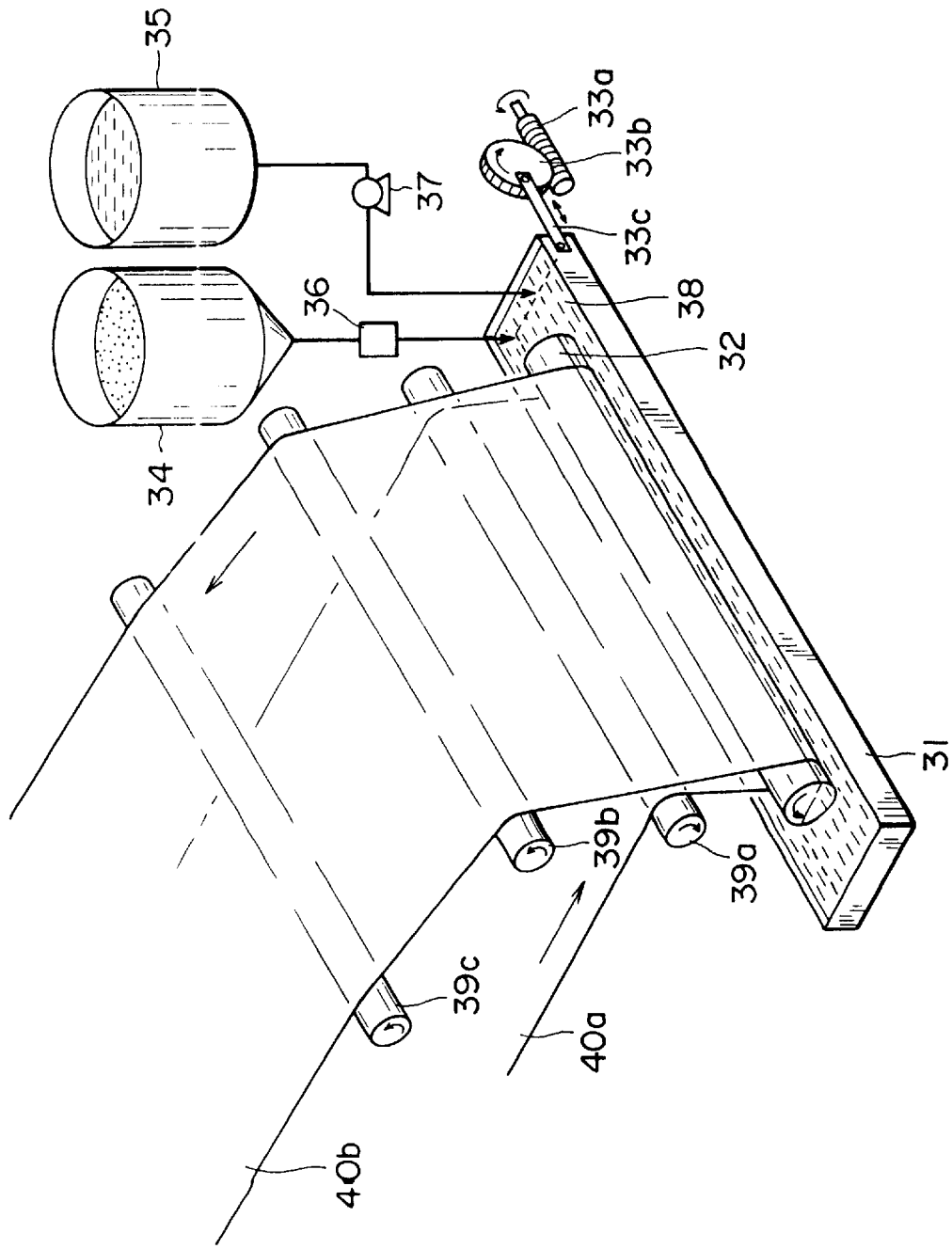
FIG. 3 is an external view schematically illustrating the second embodiment of the apparatus of the invention.

FIG. 3 is an external view schematically illustrating the second embodiment of the apparatus of the invention.

As is shown in FIG. 3, the support (40a) before attaching beads is conveyed by a pass roller (39a) and immersed in a solvent (38) in a vessel (31) by a coating roller (32). At the bottom of the vessel (31), beads are deposited (not shown). The beads are attached to the support in the same manner as is described about the apparatus shown in FIG. 2. The support (40b) after attaching beads is conveyed by pass rollers (39b, 39c), and wound up.

To the apparatus shown in FIG. 3, a bead tank (34) and a solvent tank (35) are attached. The beads in the bead tank (34) is supplied to the vessel (31) by a device (36), which adjusts the amount of the beads to supply them to the vessel constantly. The solvent in the solvent tank (35) is also supplied to the vessel (31) by a pump (37), which adjusts the amount of the solvent to supply it to the vessel constantly.

To the apparatus shown in FIG. 3, a means for vibrating a vessel is also attached. As is shown in FIG. 3, the vessel

(31) is vibrated by driving devices (33a, 33b, 33c). In the apparatus shown in FIG. 3, the beads near the coating roller (32) gradually decreases, the beads supplied from the bead tank (34) gradually increases. The beads can be uniformly deposited at the bottom of the vessel (31) by vibrating the vessel, as is shown in FIG. 3. The vessel is preferably vibrated along a horizontal direction, and more preferably along a cross direction of the support as is shown in FIG. 3. The cycle of the vibration is preferably in the range of 2 to 30 Hz, and more preferably in the range of 2 to 15 Hz.

As is shown in FIG. 3, the most preferred apparatus of the invention comprises a vessel (31) containing therein a solvent and the particles placed in the solvent, a roller (32) at least a portion of which is placed in the vessel, for conveying a support (40a, 40b) in such manner that the support passes through the solvent, comes into contact with the particles in the solvent, and then passes through the solvent again, a means (34) attached to the vessel for supplementing a supply of particles to the vessel, and a means (33a, 33b, 33c) attached to the vessel for vibrating the vessel to move the particles in the vessel.

(4) Post-treatment

After the third step, the beads can be covered with a layer comprising a polymer at the fourth step. The layer can be formed by dissolving the polymer in a solvent, coating the solution on the beads and removing the solvent.

Examples of the polymers are the same as the examples of the polymers used in the surface layer. Further, a setting resin can also be used as the polymer. The setting resins include an ultraviolet setting resin and a thermosetting resin. The polymer has a refractive index, which is preferably analogous to the refractive index of the polymer of the surface layer in the case that the surface layer is provided on a base film.

The polymer preferably has a solubility of not less than 5 wt.%, more preferably of not less than 10 wt.%, and most preferably of 15 wt.% in a solvent.

Water or an organic solvent can be used as the solvent of the polymer. Examples of the solvents include water, an aliphatic hydrocarbon (e.g., pentane, hexane, heptane, octane, isooctane, cyclohexane), an aromatic hydrocarbon (e.g., benzene, toluene, xylene), a halogenated hydrocarbon (e.g., methyl chloride, methylene chloride, carbon tetrachloride, trichloroethane), an alcohol (e.g., methanol, ethanol, isopropanol, n-butanol), a ketone (e.g., acetone, methyl ethyl ketone), an ester (e.g., methyl formate, ethyl formate, methyl acetate, ethyl acetate) and a mixture thereof.

The solution can be coated on the support according to a conventional method, such as a bar coating method, a dip coating method, a roll coating method, a blade coating method, a bead coating method, an extrusion coating method, a curtain coating method or a slide coating method.

Figure 4:
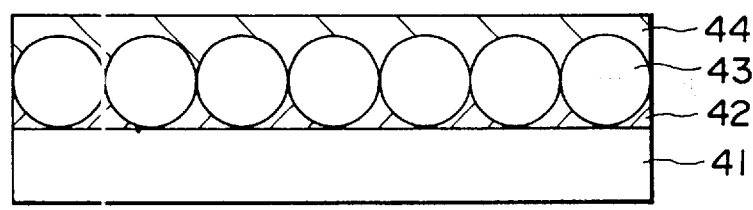
FIG. 4 is a sectional view schematically illustrating an embodiment of the composite sheet prepared by the present invention.
Figure 5:
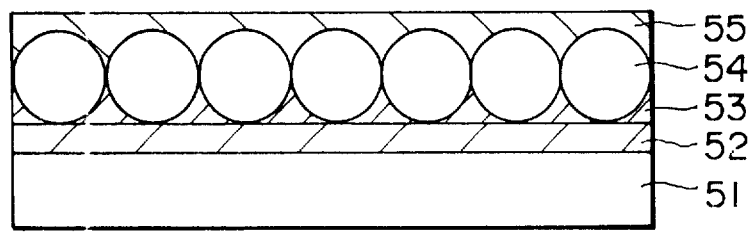
FIG. 5 is a sectional view schematically illustrating another embodiment of the composite prepared by the invention.

The composite sheets having the layer containing the polymer are shown in FIG. 4 and FIG. 5.

FIG. 4 is a sectional view schematically illustrating an embodiment of the composite sheet prepared by the present invention.

As is shown in FIG. 4, a surface (42) of a support (41) is swelled. Beads (43) are fixed with the swelled surface (42). Further, the beads (43) are covered with a layer comprising a polymer (44) after the fourth step.

FIG. 5 is a sectional view schematically illustrating another embodiment of the composite sheet prepared by the invention.

As is shown in FIG. 5, the support (51) has a surface layer (52). A surface (53) of the surface layer (52) is swelled. Beads (54) are fixed with the swelled surface (53). Further, the beads (54) are covered with a layer comprising a polymer (55) after the fourth step.

The composite sheet prepared by the present invention can be used as a retroreflective sheet or a light diffusing sheet in various technical fields. Various functional layers can optionally be attached to the composite sheet based on use of the film.

EXAMPLE 1

A composite sheet was prepared using a bar coater.
(1) Swelling the surface of the support On a polyethylene terephthalate film (thickness: 100 $\mu$m), the following gelatin solution was coated by a wire bar, and dried to form a surface layer (dry thickness: 0.1 $\mu$m).

| Gelatin solution | |
|---|---|
| Gelatin | 10.0 weight parts |
| Water | 24.0 weight parts |
| Methanol | 961.0 weight parts |
| Salicylic acid | 3.0 weight parts |
| Polyamide epichlorohydrin resin | 0.5 weight part |
| Polyoxyethylene nonylphenyl ether (polymerization degree: 10) | 1.0 weight part |

On the gelatin surface layer, water (solvent) was coated by a bar coater to swell the surface of the layer. The coating amount of water was 15 g/m$^2$.

(2) Fixing the beads onto the adhesive surface

Glass beads powder (average particle size: 32 $\mu$m, the maximum size: 36 $\mu$m, the minimum size: 26 $\mu$m) was scattered on the surface layer of the support to fix the beads onto the support.

(3) Removing the extra beads

The support was immersed in water in a dish for 2 seconds, and shaken softly. The support was taken out and dried.

(4) Post-treatment

A solution of 10 weight parts of diacetyl cellulose in 100 weight parts of acetone was coated on the glass beads by a bar coater, and dried to cover the beads with the binder layer. The dry thickness of the layer was adjusted to 40 $\mu$m.

(5) Evaluation

The above-prepared composite sheet was used as a protective film of a polarizing plate in a liquid crystal display having a collimator. As a result, the angle of field was enlarged. Further, no scratches were observed on the film.

EXAMPLE 2

The steps (1) to (3) in Example 1 were successively conducted by using the apparatus shown in FIG. 1. The line speed of the apparatus was 1 m per minute. Further, glass beads were covered with a binder layer in the same manner as in the step (4) in Example 1.

The prepared composite sheet was used as a protective film of a polarizing plate in a liquid crystal display having a collimator. As a result, the angle of field was enlarged. Further, no scratches were observed on the film.

EXAMPLE 3

The steps (1) to (3) in Example 1 were successively conducted by using the apparatus shown in FIGS. 2&3. The line speed of the apparatus was 1 m per minute. Further, glass beads were covered with a binder layer in the same manner as in the step (4) in Example 1.

The prepared composite sheet was used as a protective film of a polarizing plate in a liquid crystal display having a collimator. As a result, the angle of field was enlarged. Further, no scratches were observed on the film.

EXAMPLE 4

A composite sheet was prepared using a bar coater.
(1) Swelling the surface of the support On a triacetyl cellulose film (thickness: 100 $\mu$m), acetone was coated by a wire bar to swell the surface of the sheet. The coating amount of acetone was 20 g/m².
(2) Fixing the beads onto the adhesive surface Glass beads powder (average particle size: 32 $\mu$m, the maximum size: 36 $\mu$m, the minimum size: 26 $\mu$m) was scattered on the surface of the support to attach the beads on the support.
(3) Removing the extra beads The support was immersed in acetone in a dish for 2 seconds, and shaken softly. The support was taken out and dried.
(4) Post-treatment A solution of 10 weight parts of diacetyl cellulose in 100 weight parts of acetone was coated on the glass beads by a bar coater, and dried to cover the beads with the binder layer. The dry thickness of the layer was adjusted to 40 $\mu$m.
(5) Evaluation The above-prepared composite sheet was used as a protective film of a polarizing plate in a liquid crystal display having a collimator. As a result, the angle of field was enlarged. Further, no scratches were observed on the film.

I claim:

1. A process for the preparation of a composite sheet comprising a film support and transparent solid fine particles fixed thereon, said support having a surface that can be swelled with an aqueous or organic solvent, said particles being made of glass, and said particles having a spherical shape, wherein the process comprises the steps in sequence of:
   (1) bringing the support into contact with the solvent to swell the surface of the support, thereby rendering the surface adhesive;
   (2) bringing the particles into contact with the adhesive surface, thereby fixing at least a portion of the total number of particles onto the surface of the support;
   (3) moving the support in a solvent to remove any particles that are not fixed onto the surface of the support; and then
   (4) coating a solution of a polymer on the particles fixed onto the surface of the support to form a layer comprising the particles and the polymer covering the particles.

2. The process as claimed in claim 1, wherein the support is a transparent plastic sheet.

3. The process as claimed in claim 1, wherein the support comprises a base film and a surface layer comprising a polymer that can be swelled with the solvent during step (1).

4. The process as claimed in claim 3, wherein the surface layer has a thickness in the range of 25 to 350 $\mu$m.

5. The process as claimed in claim 1, wherein the particles have an average particle size in the range of 0.05 to 100 $\mu$m.

6. The process as claimed in claim 3, wherein the surface layer is swelled with the solvent at the step (1) in such a manner that the volume of the layer increases in the range of 1.05 to 50 times.

7. The process as claimed in claim 1, wherein the support is swelled with the solvent at the step (1) from the surface of the support to a depth of 0.05 to 25 $\mu$m.

* * * * *